(12) United States Patent
Abulnaga

(10) Patent No.: US 10,808,294 B2
(45) Date of Patent: Oct. 20, 2020

(54) TRIPLE CHAMBER FURNACE FOR SCRAP SEGREGATION AND MELTING

(71) Applicant: Baha Elsayed Abulnaga, Bellingham, WA (US)

(72) Inventor: Baha Elsayed Abulnaga, Bellingham, WA (US)

( * ) Notice: Subject to any disclaimer, the term of this patent is extended or adjusted under 35 U.S.C. 154(b) by 163 days.

(21) Appl. No.: 15/999,007

(22) Filed: Aug. 20, 2018

(65) Prior Publication Data

US 2020/0056259 A1    Feb. 20, 2020

(51) Int. Cl.
  *C22B 1/00*   (2006.01)
  *F23G 5/027*  (2006.01)
  *F27B 17/00*  (2006.01)

(52) U.S. Cl.
  CPC ......... *C22B 1/005* (2013.01); *F23G 5/0276* (2013.01); *F27B 17/00* (2013.01)

(58) Field of Classification Search
  USPC .............. 266/242; 373/78, 71, 163; 75/403; 201/3, 11, 25, 29
  See application file for complete search history.

(56) References Cited

U.S. PATENT DOCUMENTS

| | | | | |
|---|---|---|---|---|
| 3,812,620 A * | 5/1974 | Titus | ............ | C10B 49/14 48/65 |
| 5,226,375 A * | 7/1993 | Fukuda | ............ | F23B 30/08 110/101 R |
| 5,322,544 A * | 6/1994 | Stebbing | ............ | C21C 5/52 75/10.66 |
| 5,824,134 A * | 10/1998 | Powers | ............ | C21B 13/0066 75/473 |
| 6,508,853 B2 * | 1/2003 | Dimitrov | ............ | C21C 5/5252 75/10.61 |
| 7,393,379 B2 * | 7/2008 | Stebbing | ............ | C21C 5/5211 75/581 |
| 7,674,318 B2 * | 3/2010 | Stebbing | ............ | C21C 5/5211 75/10.63 |

(Continued)

*Primary Examiner* — Nina Bhat

(57) ABSTRACT

Scrap vehicles, mixtures of iron and aluminum, plastics are often pressed into bales or cubes to reduce the cost of transportation and storage to a smelter. Considering the dwindling number of large smelters in the United States due to the high pollution associated with coke fired cupolas, a new invention is developed to use natural gas, diesel fuels and clean fuels and hydrocarbons from scrap plastics in the bale. The process consists of three steps. In the first step the scrap bale is heated in a chamber up to temperatures of 1000° C. to promote the vaporization of zinc from galvanized steel, the pyrolysis of any plastics or scrap tires in the bale, and the separation of aluminum and magnesium by melting. The heat for this first stage is transferred through flue gases rising from the second and third stages after passing through a recuperator. The remaining scrap once separated from zinc, aluminum, magnesium and plastics is transferred to a second stage and melted and allowed to flow into a third stage where alloying and final removal of sulfur, phosphorus and other contaminants is completed in the hearth under a reverberating flame. Flue gases rising from the first stage are passed through condensers to precipitate vaporized zinc, and to convert hydrocarbons into fuel that is burned in the third stage burner above the hearth.

5 Claims, 7 Drawing Sheets

(56) References Cited

U.S. PATENT DOCUMENTS

| | | | | |
|---|---|---|---|---|
| 2003/0066387 A1* | 4/2003 | Stebbing | ............... | C21C 5/5211 75/10.61 |
| 2005/0229743 A1* | 10/2005 | Stebbing | ............... | C21C 5/5211 75/10.61 |
| 2006/0027953 A1* | 2/2006 | Nakashima | ......... | C22B 21/0084 266/212 |
| 2010/0147108 A1* | 6/2010 | Sahajwalla | ........... | C21C 5/5264 75/10.61 |
| 2014/0198819 A1* | 7/2014 | Gueh | ........................ | F27B 3/28 373/8 |
| 2016/0017446 A1* | 1/2016 | Abulnaga | ............... | C21B 13/10 266/44 |

\* cited by examiner

Figure 1:
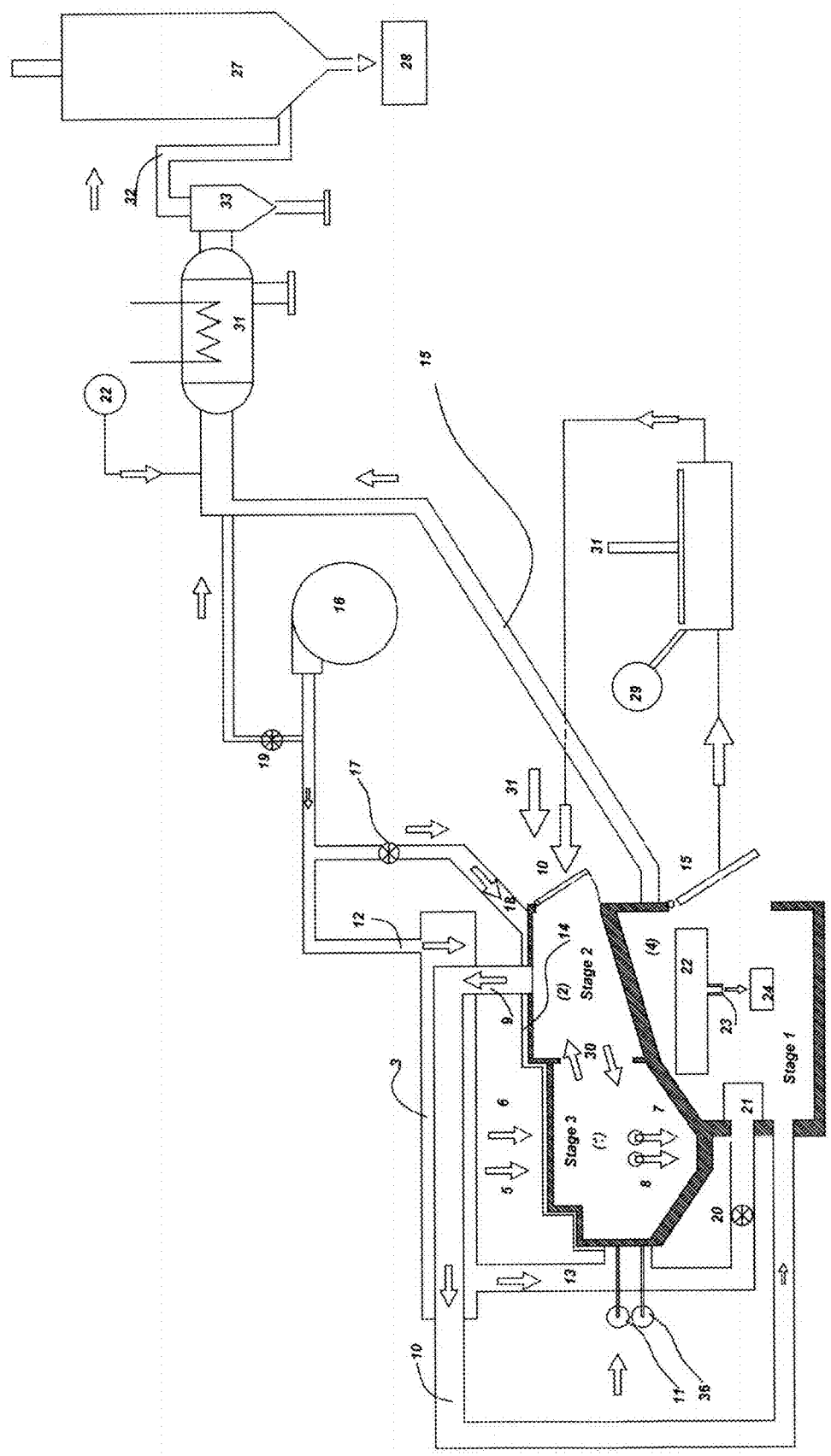
Figure 2:
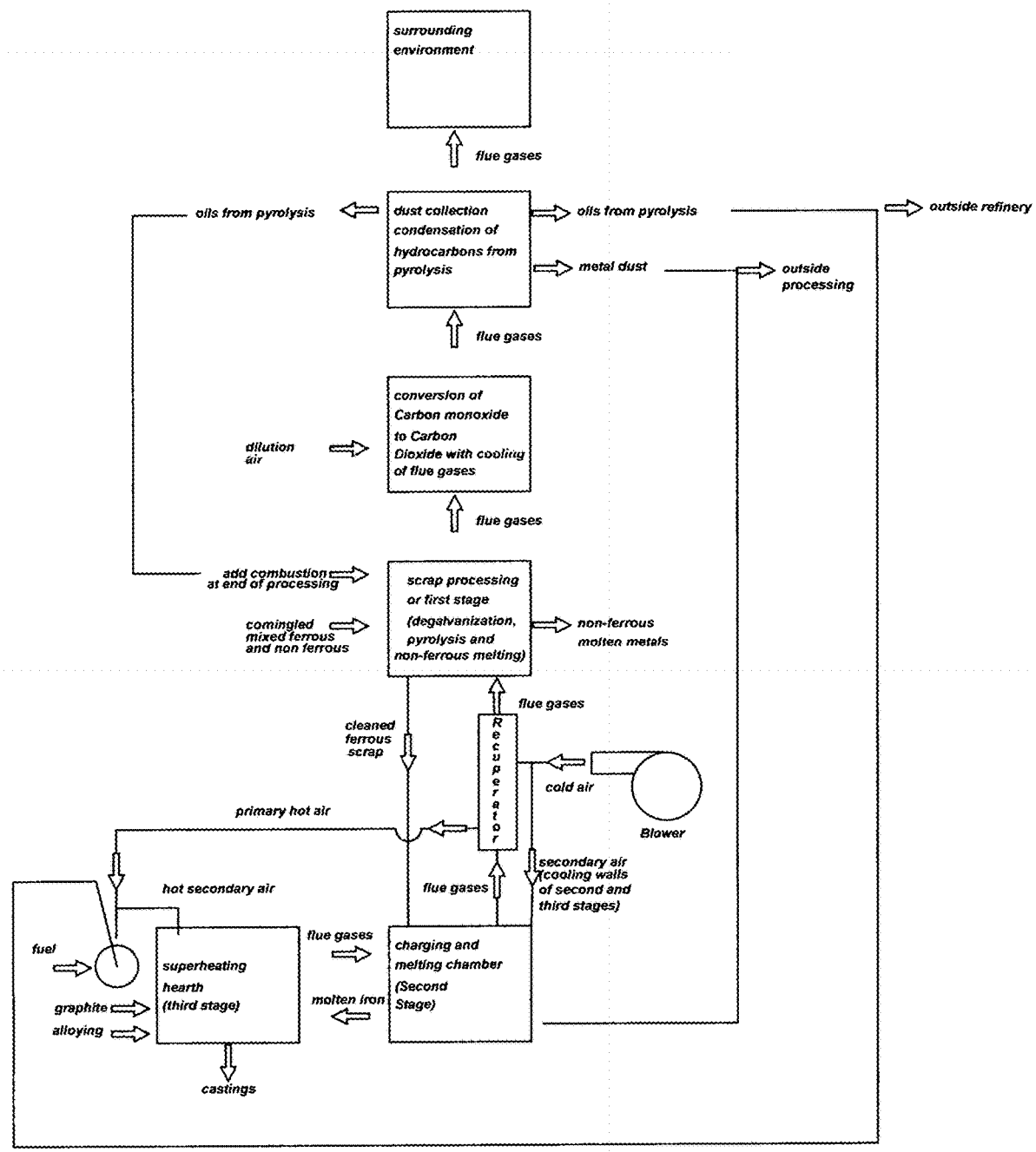
Figure 3:
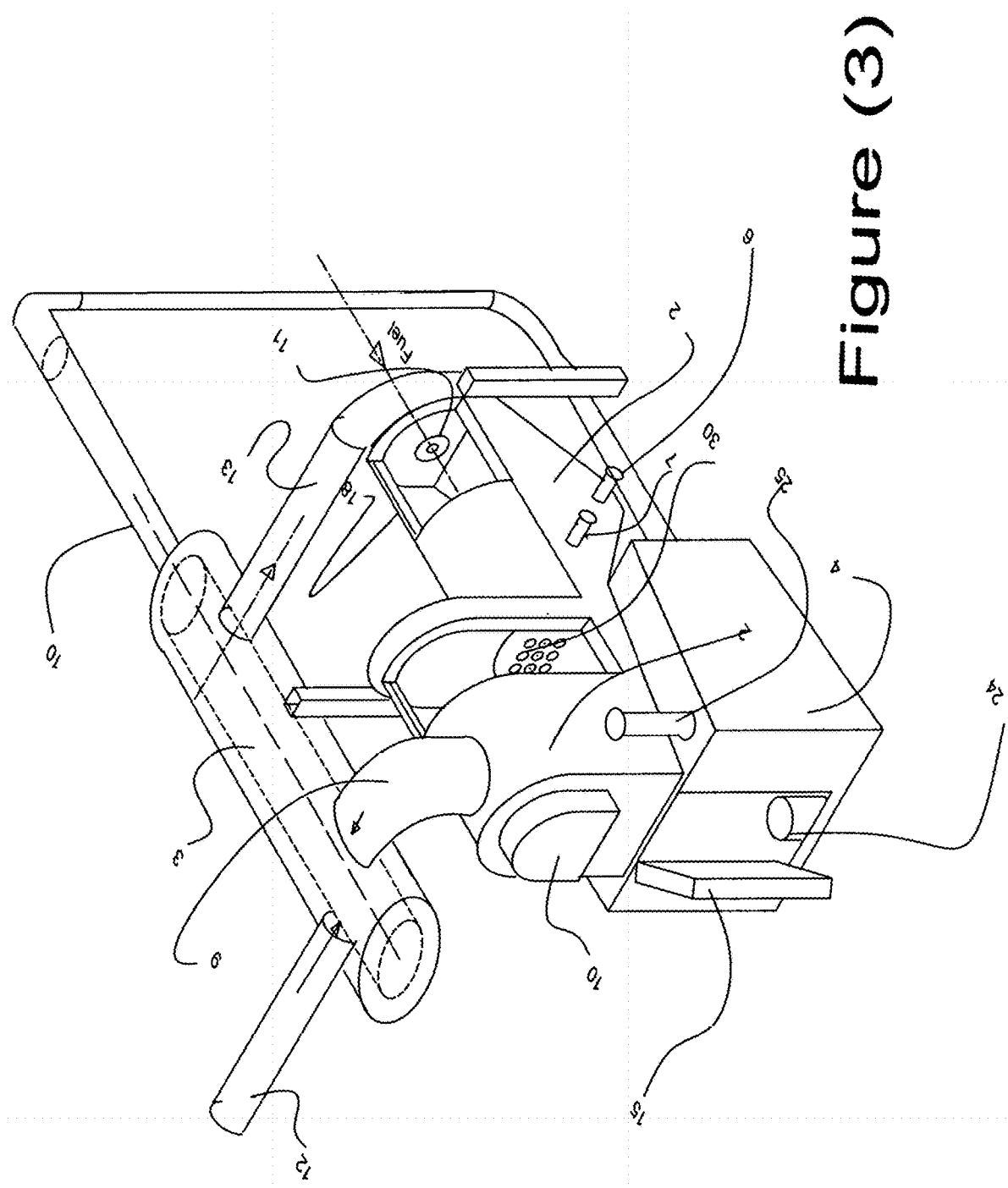

Figure (1) Flow Diagram for Processing and Melting Scrap Metal in the Triple Chamber Cokeless Furnace Figure 2 Block Diagram for Operation of the Triple Chamber Furnace Figure (3)

Figure 4:
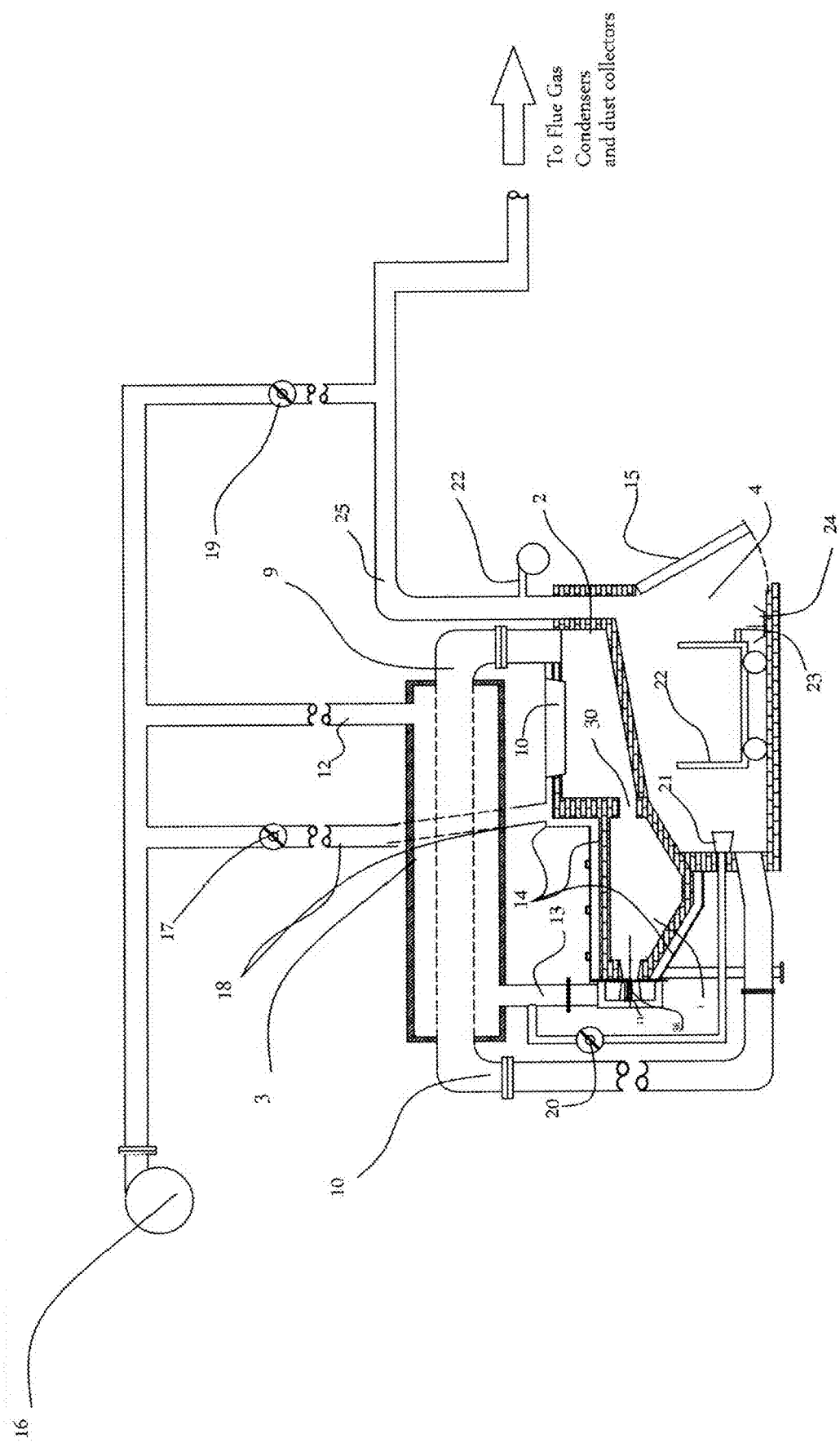
Figure 5:
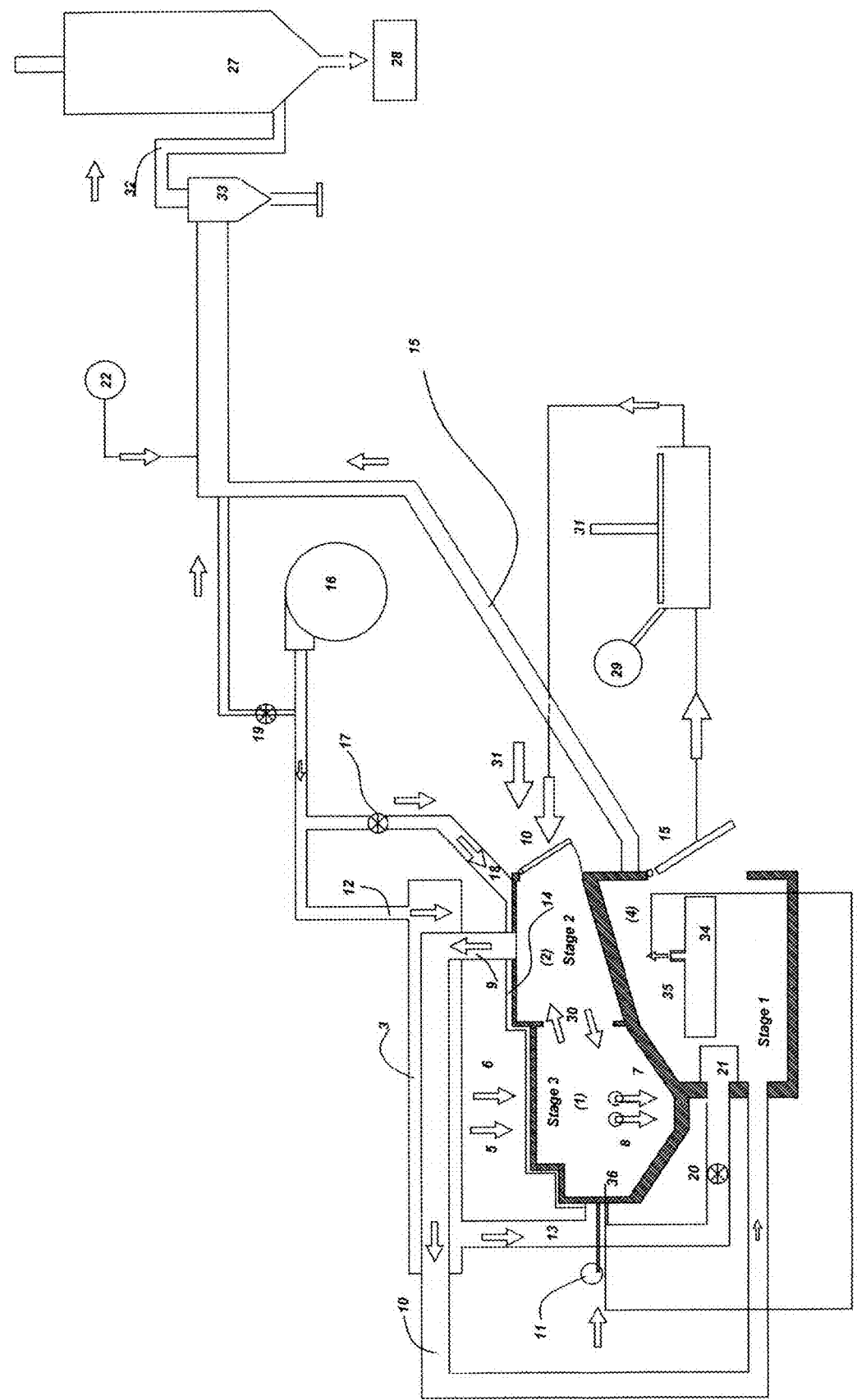

Figure 4 - Cross Sectional View of Triple Chamber Furnace

Figure (5) Flow Diagram for Processing and Melting Scrap Metal in the Triple Chamber Furnace and generation of gaseous fuel from scrap tires

TRIPLE CHAMBER FURNACE FOR SCRAP SEGREGATION AND MELTING

FIELD OF THE INVENTION

The field of the invention is methods, systems, and devices for segregating and melting bales of metals, comingled scrap metals, ferrous scrap mixed with non-ferrous scrap and plastics or used tires, by a Cokeless process where heat from flue gas resulting from combustion of fuels to melt iron in a hearth is passed through the bales to promote pyrolysis of scrap plastics, evaporation of zinc from galvanized steel, melting of non-ferrous components of scrap.

BACKGROUND TO THE INVENTION

The background description includes information that may be useful in understanding the present invention. It is not an admission that any of the information provided herein is prior art or relevant to the presently claimed invention, or that any publication specifically or implicitly referenced is prior art.

This invention is an amendment to the invention covered by U.S. Pat. No. 9,617,610 B2, whereby heat left in the flue gases after passing through the recuperator is used-to preheat scrap bales to the point that any plastics in the bales decompose, zinc in galvanized steel de-bonds by evaporation and melting, and non-ferrous metals melt down.

Scrap metals, associated with the disposal of vehicles, industrial uses, domestic uses often ends up being pressed and co-mingled in bales or cubes, meaning a mixture of all types of ferrous, non-ferrous and polymer components.

Co-mingled scrap and co-mixed scrap is usually of low economic value. It is of low density and occupies large volumes. It is common in the automotive industry, where scrap cars contain a variety of alloys, ferrous and non-ferrous as well as polymers. Comingled scrap may include the steel body of the vehicle, magnesium or aluminum wheels, aluminum engine parts, copper wires, zinc die castings, plastic dashboards, seat fabrics, rubber tires etc. . . . . Usually these scrap vehicles are dismantled in individual components of different metallurgy or materials of construction in tedious and inefficient manners and sometimes at expensive labor costs. In many underdeveloped countries the scrap separation is often done in dangerous conditions without proper protection to the workers.

The iron and steel scrap market is very large. According to the Bureau of International Recycling (BIR) the world market for steel and iron scrap was 94 million metric tons in 2015. Some experts anticipate the international demand for scrap to reach 110 million tons by 2019. In 2015 Europe ranked as number one exporting 17 million metric tons and the USA exporting 15.3 million metric tons. China uses on the average 220 kg of scrap being used in every ton of steel produced. Scrap is usually processed in very large furnaces capable of absorbing 100 to 130 tons per hour of scrap and fresh ore.

The iron foundries rely on scrap as well as fresh pig iron as feedstock for their castings. Refining is not possible in the induction furnace, so a carefully selected charge must be used, but any type of steel may be melted In the United States the Electric Scrap Research Institute has developed guidelines for scrap materials, but often foundries develop their tougher specifications based on their needs pushing for clean scrap. For example foundries pouring ductile iron push for manganese contaminant at less than 0.05%, chromium at less than 0.05% and Vanadium at less than 0.01%. There is a need to refine scrap to meet the demands of ductile iron.

Fires and explosions have occurred in electric arc furnaces when they were loaded with oil-contaminated scrap.

Various patents in the past have tried to offer methods for treating scrap such as U.S. Pat. No. 5,049,067 which uses multiple furnaces within a system, multiple conduits and one way valves to apply heat selectively to zones of the scrap. Such a system is complex with issues of sealing conduits for the flue gas, and requires number burners in different chambers of the system, recirculation blowers on flue gas, a number of air to fuel ratio control systems on different circuits. The complexity of such a system may have prevented its implementation on an industrial scale.

U.S. Pat. No. 3,556,500 issued on January 1971 with inventors Romulus, Wallace and Seguin assigned to Huron Valley Steel Corporation presents a design for feeding the co-mingled scrap at one end of a long furnace, travelling it to be exposed to different burners at different temperatures above a vibrating tray and discharging the ferrous components at the other end of the furnace. As stated by the inventors the design is for co-mingled scrap pre-processed into small pieces. The design requires a number of burners but does not describe how the flow of flue gases from one zone to another could potentially affect the selective melting of non-ferrous scrap. This invention does not attempt to use waste heat or focus on thermal efficiency of the furnace.

U.S. Pat. No. 5,322,544A issued on June 1994 describes the benefits of melting rubber in an electric furnace with steel as a source of additional heat. This patent is however different than our proposed invention as it relies on combustion using oxygen and using rubber as a combustible, where as in our current invention we focus on using waste flue gases to promote pyrolysis of plastics and tires mixed with the scrap in oxygen deprived flue gas system.

U.S. Pat. No. 2,804,295 issued on August 1957 describes a chamber for preheating ferrous scrap to typically 1400 F (760 C) as a pre-processing step to feed to an electric induction furnace. The scrap is heated by an oil-fired or gas fired furnace. The patent focuses on the importance of reaching such a high temperature to reach the critical recalescence temperature at which the scrap becomes non-magnetic and loses its yield strength. The application of oxygen creates vapors of unwanted residuals such as zinc and arsenic that are removed in the flue gases. It is however uncertain today that purification of scrap by forming vapors of zinc and arsenic would be allowed by various air emissions regulations, and they would have to be condensed in the dust collection system.

Reaching the temperature of 760° C. described in U.S. Pat. No. 2,804,295 allows the operator to be above the yield point of scrap and therefore crush or press down the scrap to a smaller volume before being fed to the electric furnace.

Despite its merits U.S. Pat. No. 2,804,295 covers a method of preparing scrap for electric furnaces in a separate pre-heater. Such a separate pre-heater adds complexity to the foundry, and as I will show in the description of my invention can be replaced by a chamber receiving flue gases from the recuperator.

Patent 2003/0122290 AI describes a furnace for pre-heating scrap using a mixture of natural gas and oxygen. The patent I exclusively suitable for ferrous mixtures and does not provide a method to separate non-ferrous elements in comingled and mixed scrap. The patent does not feature an intermediary step to press down the scrap beyond the yield point and before melting and would result in a fairly large furnace if scrap is not pre-shredded prior to be fed to the preheated.

U.S. Pat. No. 2,671,724 issued on March 1954 describes the problems associated with pre-heating scrap and proposes to flood the space between the interstices of scrap with oxygen or an oxygen-rich atmosphere. However this design does not reduce the volume of the furnace needed to handle the low density scrap.

U.S. Pat. No. 7,101,463 B1 describes a process to recover oil from pyrolysis of gas. The invention uses a rotary kiln to process shredded tires. It is not dedicated to melting ferrous scrap, but focuses of separating collected hydrocarbons into different grades.

German Patent DE102008056812A1 "Processing steel scrap, comprises introducing steel scrap in e.g. alkaline solution, separation solution, pre-heating steel scrap using waste gases, introducing steel scrap in melting furnace, and removing originating waste gases. "Inventor: Hans-Bernd Dr. Pillkahn describes a method of pre-heating scrap for a vertical shaft electric arc furnace, where as the flue gases generated by the electric arc are used to preheat the steel scrap. The steel scrap must also be pretreated with an alkaline or acidic solution to remove paints, zinc coating in galvanized steel scrap. The nature of these flue gases are different than in my invention, in the sense that they are not the result of combustion of a fuel and are not oxygen deficient. The scrap is therefore pretreated with sulfuric acid or by a solution in electrolysis before being pre-heated. The electrolysis current promotes the breakdown of coatings and paintings on scrap steel. The steel must also be cut in small pieces prior to immersion in the acidic or alkaline solution. While DE102008056812A1 offers an interesting solution for coated and galvanized scrap to be fed into an electric arc furnace, it is difficult to extend to comingled and co-mixed scrap with important quantities of non-ferrous alloys such as automotive scrap. Subsequently the scrap is preheated to 300-1000° C., averaging 700° C. which is the recommend temperature to short the melting time in the electric arc furnace.

Bernardo A. Duran III In "Galvanized Steel in High-Temperature Environments" indicated that zinc starts to peel-off from galvanized steels at the temperature of 250 C. Karisson M. C. F, D. Corr, C. Forsgren and B. M. Steenari—in "Recovery of titanium dioxide and other pigments from waste paint by pyrolysis" showed that under conditions of pyrolysis, paints can decompose and release metal-oxide pigments such as Titanium Oxide that can then be recycled for new paints.

The melting point of Zinc is 420° C., while the vaporization temperature is at 906° C., according to https://www.engineeringtoolbox.com/melting-boiling-temperatures-d_392.html The purpose of the pre-treatment chamber is to clean co-mingled scrap for all non-ferrous elements. For example Bahrl Oztruk and R. J Frueman 1996. In their article "Vaporization of Zinc from Steel Scrap" ISIJ International, Vol 36 (1996) discuss vaporization of zinc from scrap in a carbon dioxide and carbon monoxide atmosphere. A reaction occurs as the zinc thermal debonds from scrap steel and vaporizes in a $CO_2$ atmosphere, with some combination with the oxygen leading to oxidation of zinc vapors. Tests conducted in a CO atmosphere or reduced atmosphere is very fast at 950° C.

SUMMARY OF THE INVENTION

The invention covers a process of dealing with bales and cubes of pressed scrap vehicles or comingled mixtures of scrap metals and plastics through three steps, each represented by a dedicated chamber by the Cokeless combustion process. A burner over a hearth generates flue gases that transfer to an intermediary chamber, then pass through a recuperator to pre-heat combustion air for the hearth burner. These flue gases are deprived of oxygen but rich in carbon monoxide and carbon dioxide and are then directed to a chamber where comingled scrap, cubes and bales of scrap are heated at 600 to 1000° C. to promote pyrolysis of plastics, thermal separation and evaporation of zinc from galvanized steel, melting of aluminum and magnesium or non-ferrous metals, leaving only scrap ferrous mass of iron and steel that can be transferred to the intermediary chamber or second stage for melting of the remaining ferrous scrap. As the ferrous scrap melts by exposure to the flue gases rising from the hearth the metal flows to the hearth, where the metallurgist can operate final inoculation, addition of lime, remove contaminants such as sulfur or phosphorus and from there pour the metal to molds outside the furnace The invention and its advantages will become more readily apparent on examining the following description, including the drawing in which like characters refer to like parts is described in greater details hereinafter relative to a schematic representation of the process is presented in FIGS. (1) to (5).

BRIEF DESCRIPTION OF THE DRAWINGS AND FIGURES

FIG. (1) shows a process description diagram of the invention for processing mixed and co-mingled scrap, with extraction of hydrocarbon vapors from heat degradation of plastic and rubber in the co-mixed scrap.

FIG. (2) shows a block diagram for the operation of the invention for processing mixed and co-mingled scrap with hydrocarbons recovery at the condensers.

FIG. (3) shows a three dimensional preferred embodiment of the invention.

FIG. (4) shows a cross-sectional drawing of the invention.

FIG. (5) shows a process where scrap tires and plastic are deposited in a closed container in the scrap processing chamber and where the container is vented to auxiliary burners of the furnace so that the vapors and hydrocarbons are directly incinerated in the furnace for fuel.

FIG. (6) shows a block diagram for the operation of the invention for processing mixed and co-mingled scrap, bails of comingled scrap with hydrocarbons recovery at the condensers.

FIG. (7) shows the three chamber cokeless furnace process for scrap segregation and melting.

DETAILED DESCRIPTION OF THE INVENTION

The invention is an improvement over the invention described in U.S. Pat. No. 9,617,610 B2 with emphasis on melting ferrous scrap or comingled and mixed scrap of ferrous and non-ferrous elements.

It was found out that after construction of the pilot plant for the invention covered by U.S. Pat. No. 9,617,610, that it could be extended to the process of melting comingled and mixed scrap metal, bails of comingled scrap or pressed vehicles or for certain steps of pre-heating ferrous charges through further use of waste heat on the discharge of the recuperator in a dedicated chamber.

The Cokeless reverberatory furnace for melting iron with separate hearth and melting chamber described by U.S. Pat.

No. 9,617,610 featured a recuperator, extracting heat from flue gases to pre-heat the combustion air. For example when the furnace was operating at 1600 Celsius, the flue gases leaving the recuperator were at 610 to 900° C. Celsius leaving sufficient heat in the flue gases that needed to be dissipated before entering the dust collection system that typically operates at temperatures lower than 250 Celsius. The discharge temperature of the recuperator could also be altered by controlling the flow of cold combustion air through the recuperator.

There are numerous possibilities to use such waste heat such as extracting power, adding a second stage recuperator but these usually come at an important additional capital cost. Direct conversion of such waste heat into the process improves the overall thermal efficiency of the Cokeless furnace. It is therefore the aim of this new invention to add a step of pre-heating, and preparation of the scrap for melting.

There are numerous possibilities to use such waste heat such as extracting power, adding a second stage recuperator but these usually come at an important additional capital cost. Direct conversion of such waste heat into the process improves the overall thermal efficiency of the Cokeless furnace. It is therefore the aim of this new invention to add a step of pre-heating, and preparation of the scrap for melting.

FIG. (1) shows a flow diagram for metals and gases, FIG. (2) shows a block diagram while FIG. (3) shows a preferred embodiment of the triple chamber Cokeless furnace, and FIG. (4) a cross-sectional cut through the three stages of the furnace.

Referring to FIGS. (1) and (3) the invention consists of a hearth (1), a metal charging and melting chamber (2), a heat recuperator (3) and a post recuperator scrap processing chamber (4) and associated components as will be described in the foregoing paragraphs.

As previously described in U.S. Pat. No. 9,617,610 B2, the bottom of the melting and charging chamber (2) is inclined or sloped at an angle smaller than the angle of repose of solid iron, so that molten iron can flow by gravity into the hearth once the melt is started.

The hearth (1) and metal melting chamber (2) are interconnecting so that flue gases rise from the hearth to the melting chamber while molten metal counter flow from the melting chamber to the hearth at the opening (30) between the second and third stages.

In the process of cleaning, smelting and refining scrap, the three chambers operate counter flow to the flow of products of combustion, so that the scrap process chamber (4) downstream the recuperator (3) acts as the first step to clean the ferrous scrap, and separate it from non-ferrous contaminants and metals, while the charging and melting chamber (2) upstream the recuperator (3) acts as the second stage to melt the ferrous scrap and finally the hearth (1) for superheating, alloying and carbon addition, connected to the burner (11) acts as a third stage in the conversion of scrap into ingots or castings.

In compact design of the furnace, the first stage or scrap process chamber (4) is built under the second stage (2) so that the bottom of the melting and charging chamber constitute the roof of the first stage and absorb some of the heat losses. The space under the third stage is then occupied by conduits of flue gases from the recuperator to the first stage and partially by the first stage to absorb some of the heat losses from the floor of the hearth (1)

Comingled scrap is fed to the scrap processing chamber (4) through a door (15) before turning on the furnace. It is recommended to use special containers (22) to load the scrap with a side spout or a channel (23) to allow the flow of molten non-ferrous scrap out of the container during processing into a crucible (24). The side walls of the containers should be perforated to allow the flow of flue gases through the scrap charge from all sides.

The inlet door (15) is closed after charging the scrap processing chamber (4) hermetically to seal the chamber against escaping flue gases, and to prevent the entry of air from surrounding environment.

Flue gas or products of combustion pass through the recuperator (3) from the discharge (9) of the metal charging chamber (2) and flow to the scrap processing chamber (4) through a conduit (10). Part of the conduit is built under the hearth (1) to enter the scrap processing chamber (4).

While passing through the recuperator, the flue gases transfer heat to fresh combustion air entering the recuperator at conduit (12) and leaving at conduit (13) to enter the burner (11) of the hearth, as primary air, where fuel in gaseous form, liquid or pulverized solid is added to complete the combustion.

In the case of iron and steel carbon is added to the melt through a carburizer (5) to control the metallurgy.

Various alloying elements are also added to the molten metal in the hearth (1) through port (6).

Molten metal leaves the hearth (1) at the spout (7) and the slag is removed at spout (8) through established technologies of spouts, slag extraction.

The fresh air is pumped by a blower (16), with an optional stream passing through a valve (17) and applied to the walls of the melting chamber (2) and hearth (1) as cooling medium. The cooling to the roof and side walls of the hearth and melting chambers being done through the design of a dual wall system for both chambers body and roof sections. This increases the life of the refractory exposed to the intensive heat of the furnace. The design of double wall (14) can follow general principle of engineering and welding and will not be described further in this specification.

After passing through the double wall of the furnace (14) the air is injected at the burner (11) forming secondary air of combustion.

Combustion is done in stoichometric conditions in the presence of primary and secondary air, to consume available oxygen and release oxygen deficient flue gases to the scrap processing chamber (4).

Another stream of the fresh air from the blower (16) passes through a control valve (19) and is applied to flue gases in conduit (25) as dilution air to cool down flue gases as well as to achieve the transformation of carbon monoxide into carbon dioxide through the dissociation of carbon monoxide by reaction with oxygen. The most optimum dissociation occurs at the temperature range of 400 to 450 Celsius.

Flue gases leaving the recuperator enter the scrap processing chamber (4) through conduit (10) at sufficient temperature to melt non-ferrous metals.

Provided that the temperature in the process chamber (4) exceeds the melting temperature of zinc or 450 Celsius, the zinc coating of galvanized steel starts to breakdown by melting. In fact galvanized steel is known to start peeling off at 250 Celsius. The molten zinc is collected with non-ferrous metals at the spout (23) into a crucible or channel (24).

Further processing of the non-ferrous molten metal from (24) can be done externally and will not be described further.

The flue gases entering the processing chamber (4) are depleted of oxygen as result of the combustion at the burner

(11) at stoichometric conditions. They can clean the scrap from oil contamination by direct evaporation at reduced risk of explosion.

Scrap tires contain 12% steel and some quantities may be processed with other plastics, as part of the co-mixed and comingled scrap, however when the oxygen-depleted flue gases come in contact with plastic and rubber components of the comingled scrap, at temperatures particularly higher than 400 Celsius, they cause heat degradation in the absence of oxygen by a process called pyrolysis. The scrap plastic, and scrap tires decompose into hydrocarbon volatiles that are carried away by the flue gases. Solid residue in the form of recovered Carbon Black is a byproduct of the pyrolysis of tires.

The contact of plastics and rubber with molten non-ferrous alloys in the scrap such as zinc and aluminum accelerates the pyrolysis, so that the rubber tires and plastic scrap do not necessarily need complex pre-processing such as grinding and shredding prior to introduction to the scrap processing chamber (4).

Under the effect of heat from the oxygen-deprived flue gases, paints are subject to pyrolysis and release some of the metal oxide pigments such as Titanium-Oxide.

After a retention time to melt down non-ferrous components of the scrap, and to remove all polymers by pyrolysis, is lapsed in the scrap processing chamber (4), and the non-ferrous metals are removed from the crucible (24), the door (15) is closed and a final heat step is applied to the remaining ferrous scrap by artificially raising the temperature of the scrap processing chamber to 760 C or above the critical temperature for loss of yield strength or recalescence temperature so that the scrap can be pressed down to a low volume in a press or under a plunger (31) before being fed to the melting chamber (2).

One method to increase the temperature of the flue gases feeding the scrap processing chamber consists of feeding some preheated combustion air from the recuperator through valve (20) and adding fuel at the burner (21) after the non-ferrous scrap has been removed to heat up the remaining ferrous scrap to its critical temperature needed to squash it down.

The burner (21) can also be ignited during start-up of the furnace to start scrap processing until flue gases of temperature above 500 C are available downstream of the recuperator and then turned off to save fuel.

It is recommended to pass the ferrous scrap through a press (16) after leaving the scrap processing chamber (4) to compact it before loading to the charging and melting chamber (2).

Reducing the volume of processed scrap in the press or plunger (16) is critical to build the hearth and charging chambers in economical sizes by increasing the density of the scrap from less than 2 t/m$^3$ to higher than 6 t/m$^3$ ideally.

The ferrous scrap is fed to the melting chamber at the charging door (10) where it is mixed with other ingots or clean charges of metal (31).

The discharge door (15) in FIG. (1) is shown as a side door, but can be equally installed on the top if a bucket and crane system is used to remove clean up ferrous scrap.

The removed ferrous scrap may contain recovered Carbon Black from the pyrolysis of plastics and rubber in the scrap or may contain ash residues. These residues and recovered Carbon Black are removed by passing the scrap car through a vacuum chamber (29) on the way to the charging chamber of the furnace (2).

In the case of recovered Carbon black from the pyrolysis of scrap tires, it can be used as a source of Carbon for controlling the metallurgy of the melt in the hearth (1) by feeding at the carburizer (5) or if produced in large quantity from pyrolysis it can be extracted to be burned at the hearth burner as pulverized solid fuel.

When the scrap includes waste rubber tires, the sulfur in the tires used for vulcanization tends to decompose and form sulfur compounds that are neutralized by the injection of lime at (22) on the way to the flue gas processing unit (27). The flue gas processing unit (27) is designed specifically to process the flue gases and separate any metal dust.

In the case of pyrolysis of waste plastics and tires, the flue gas processing unit may include a condenser (31) to condensate hydrocarbons and collect them, and a cyclone (32) to separate the condensed hydrocarbons. These hydrocarbons are then collected for further processing (33) in conventional refineries or re-injected in auxiliary burners (36) at the hearth and scrap processing chamber (11) and (21).

External refining processes are not the subject of the current patent application and will not be discussed.

The metal dust collected from the flue gas processing unit is removed in a container (28) can then be sent to further powder processing centers or recycled to the charging chamber (2). External processes for treating the metal dust are not the subject of the current patent application.

When comingled scrap is not available, and only scrap steel and iron are used, the waste heat from the recuperator can be used to pre-heat ferrous scrap, remove zinc and paint and raise temperature to reduce the yield strength and facilitate the densification of the scrap under the plunger (16). The oxygen deprived flue gases applied to the scrap processing chamber (4) clean the scrap from contaminated fluids and oils without risk of fire as oxygen is not injected as long as valve (20) remains closed.

Valve (20) is opened at the end of each scrap pre-heating cycle prior to removal of processed scrap to purge the scrap processing chamber (4) with fresh air while the burner (11) is shut off to stop the flow of flue gases. The valve (2) is then closed after charging the scrap processing chamber (4) with a new load of scrap, and the burner (11) is lighted up again.

In an embodiment of the furnace the scrap tires and plastics are used to fill a container or crucible with non-ferrous metal such as shown in FIG. (5). The container (34) is then closed except for a vent (35). The container is then externally heated by the passage of flue gases from the recuperator (3) and metal melting chamber (2) and start to decompose in the molten non-metallic metal and produce vapors rich in hydrocarbon. These vapors are collected at the vent (35) and re-injected at auxiliary burners (36) at the hearth chamber so that the heat of decomposition of scrap rubber and tires is used directly in the process of melting iron and steel scrap or other metals in the chamber without further steps of condensation or segregation from the flue gases.

In the case of degrading the rubber tires in a closed containers and burning the resultant vapors directly in the hearth, some sulfur compounds from the tires will be incinerated and will result in sulfur dioxide that must be neutralized by injection of lime at (22).

Recovered Carbon Black in the closed containers is collected at the end of the batch or intermittently by vacuum and redirected to the carburizer as additive to the metallurgy or injected as pulverized solid fuel at auxiliary burners for the hearth.

Figure 6:
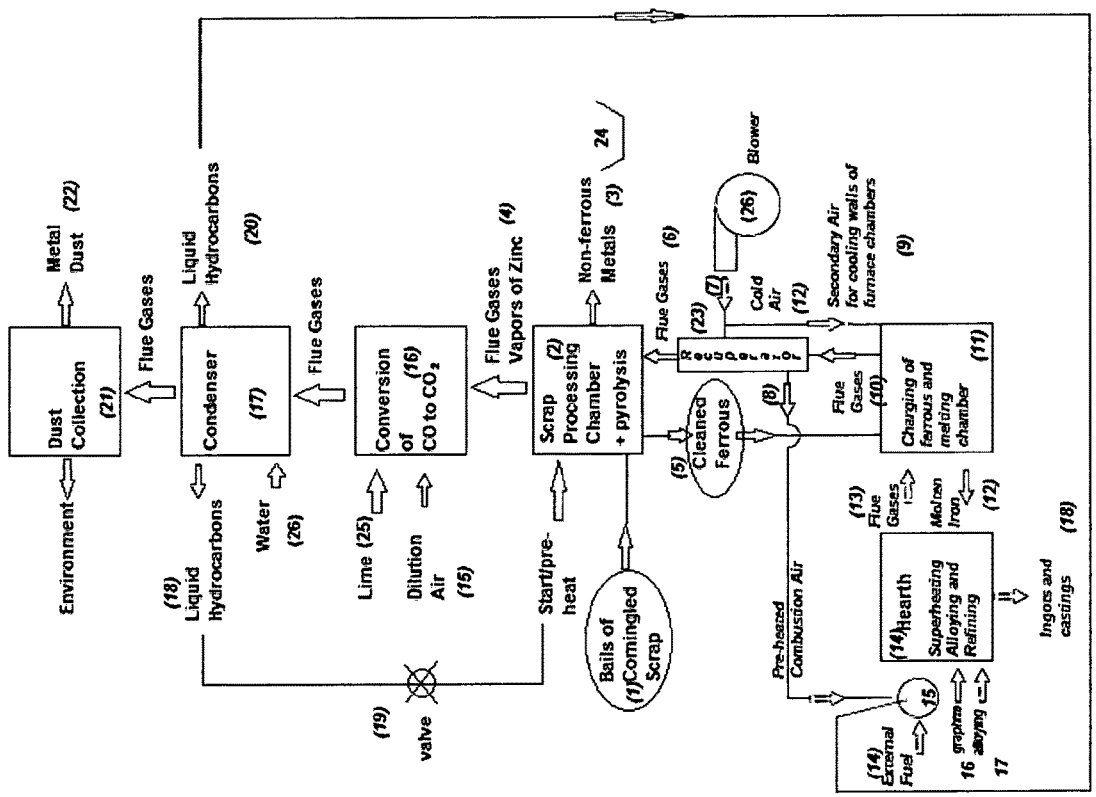
Figure 7:
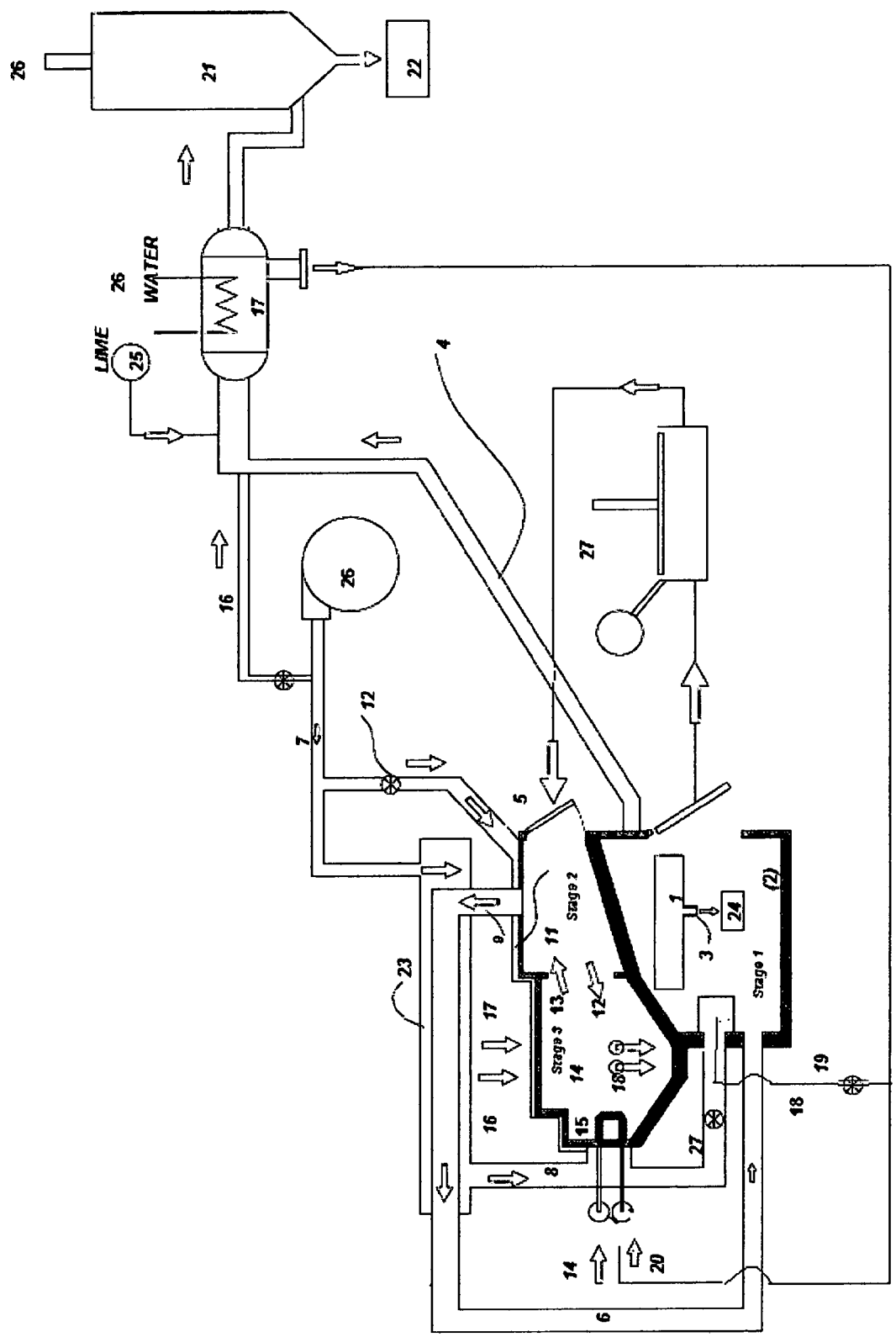

FIG. 6 illustrates a process flow diagram while FIG. 7 illustrates a representation of the invention—Bails of comingled scrap or pressed scrap cars (1) are fed to a scrap processing chamber (2) where it is heated with flue gases (6). These flue gases are the result of combustion in the hearth (14) and are deprived of oxygen. They pass through the recuperator (23) on their way to the scrap processing chamber (2) via duct 6. They are sufficiently hot to induce pyrolysis of scrap tires or plastic parts that may be part of the comingled scrap.

when the flue gases in the scrap processing chamber (2) are hot at temperatures above 8500 C, they induce vaporization of zinc leaving with the flue gases. Hydrocarbons resulting from pyrolysis of plastics and scrap tires also leave with the flue gases from the scrap processing chamber (2).

Some dilution air is added in the duct (16) to cool the flue gases, but also to initiate the conversion of Carbon Monoxide into carbon Dioxide. These flue gases are further cooled by passing through a condenser (17) where the hydrocarbons are separated from the flue gases by cooling to form liquid hydrocarbons (18) and (20).

In FIG. (6) Liquid hydrocarbons (20) are re-injected into the burner (15) at the hearth (14) of the furnace.

In FIG. (6) Some of the liquid hydrocarbons (18) pass through a valve (19) and are used to start the process in the scrap pre-heating furnace (2) until the hearth (14) produce sufficiently hot flue gases through the recuperator (6) to induce pyrolysis, degalvanization of scrap and melting of non-ferrous metals in (2)

In FIG. (6) Non-ferrous metals such as aluminum, magnesium, liquid zinc are collected through a side stream (3) for final processing outside the furnace, or into a ladle (24) (FIG. 7), while the remaining iron and steel form cleaned material(5) and is transferred into the chagrining and melting chamber(11) and exposed to the hot flue gases(13) rising from the hearth(14).

In FIGS. (6) and (7), liquid iron (12) flows from the charging and melting chamber (11) to the hearth (14) where further graphite (16) and alloying elements (17) are added for refining before leaving the furnace as ingots and castings (18).

Combustion air is provided by a blower (26) and most of it passed through a recuperator (23), except for a side-stream (12) where it is preheated by exchanging heat with the flue gases (10) rising from the ferrous metal charging chamber. Once preheated, the combustion air leaves at (8) and is directed to the burner (15) where it is mixed with external fuel (14) such as natural gas, liquid hydrocarbons, pulverized coal and with produced liquid hydrocarbons (20). The side-stream (12) is used to cool the walls of the furnace and re-injected afterwards as secondary preheated air into the burner (15).

In FIG. (6), flue gases leave the condenser (17) and are directed to a dust collection system (21) to remove any dust or metal dust (22) before releasing the flue gases to the environment (27).

When sulfur dioxides develop from the pyrolysis of tires, lime is added (25) to neutralize the sulfur before the condensed hydrocarbons are sent to the hearth burner at (20).

When transferring cleaned up ferrous scrap a press (27) shown un FIG. (7) is used to press down the scrap in smaller volume.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In some embodiments, the numbers expressing quantities of number of fittings properties such as melting of metals, combustion conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired conditions for melting and combustion, heat transfer sought to be obtained by a particular embodiment Notwithstanding that the numerical ranges and parameters setting forth the broad scope of some embodiments of the invention are approximations, the numerical values set forth in the specific examples are reported as precisely as practicable.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

What is claimed is:

1. A three step process for melting bails of comingled metal, rubber and plastic scrap in a reverberating furnace comprising:
   a.) introducing comingled bails of scrap to a first chamber of a three chambered furnace and heating to a temperature of 600-1000° C. by applying flue gases resulting from other part of the furnace to pyrolyze rubber and plastics producing a flue gas; and heating and melting zinc contained in said bail of scraps;

separating the pyrolyzed gases from the rubber and plastics and separating the zinc from galvanized steel and to promote the melting of non-ferrous metals within comingled scrap leaving a mass of ferrous scrap;

b.) feeding the ferrous scrap following treatment in the first chamber into a second, intermediary chamber, mixing the ferrous scrap with pig iron or iron carbide, for direct iron reduction which is melted and shaped into a briquettes or pellets, and urging the briquettes or pellets to a third chamber reverberating furnace hearth;

c.) melting and alloying said ferrous briquettes or pellets within a third chamber of said hearth furnace including the step of removing sulfur, phosphorous and other contaminants contained in the said scrap, the ferrous briquettes or pellets.

2. A process as claimed in claim 1 wherein the flue gases generated in the third furnace chamber, also called hearth, flow to the second intermediary chamber and passed through a recuperator or regenerator to preheat combustion air used in with the burner within the furnace hearth, and whereby the flue gases leaving the recuperator or regenerator is sent to the first scrap treatment chamber for pyrolyzing and melting of zinc and non-ferrous metals.

3. The process according to claim 1 wherein the flue gases from the heating and pyrolysis step of the scrap in the first furnace chamber is cooled to precipitate zinc removed by evaporation from the comingled scrap.

4. The process of claim 1, wherein flue gases from the pyrolysis of rubber or plastics contained within the comingled scrap is passed to a condenser for extraction of hydrocarbon gases contained within the flue gases; followed by removal of chlorides from the hydrocarbon stream and introducing the hydrocarbon gases to the burners within the reverberating furnace.

5. The process of claim 1, wherein the non-ferrous metals are melted in the first chamber is separated and introduced into a crucible outside of the reverberating furnace.

* * * * *